United States Patent Office 3,326,892
Patented June 20, 1967

3,326,892
ALLANTOIN SODIUM RIBONUCLEINATE
Irwin I. Lubowe, 667 Madison Ave.,
New York, N.Y. 10027
No Drawing. Filed Apr. 16, 1965, Ser. No. 448,863
1 Claim. (Cl. 260—211.5)

This invention relates to new compositions of matter and, more particularly, to novel compositions containing allantoin sodium ribonucleinate and to processes for making said compositions. As a new composition, allantoin sodium ribonucleinate may be utilized as a hypo-allergenic hair spray or combined with other hair spray compounds aiding in the manageability of the hair and also in the treatment of dandruff conditions.

Allantoin is a nitrogen-containing compound having the following structural formula:

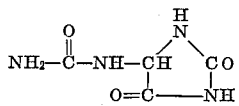

The composition of the present invention, allantoin sodium ribonucleinate, has the following structural formula:

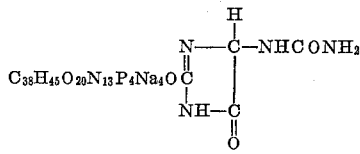

This composition is made by mixing 125 grams allantoin thoroughly with 875 grams of sodium ribonucleinate. To this mixture is immediately added 15 cc. boiling, distilled water. The mixture is mixed continually until it is almost a dry mass. Thereafter, the mass is spread upon a tray and dried for about 68 to 8 hours at 140° F. to 160° F.

The approximate analysis of the resulting composition is as follows:

|  | Percent |
|---|---|
| Sodium ribonucleinate | 87½ |
| Allantoin | 12½ |

This composition is soluble to the extent of 6% to 8% in water, and is very soluble in hot water.

Another form of the composition, allantoin sodium ribonucleinate, is made by the same process as described hereinbefore, except that 500 grams of each of the components are utilized, resulting in an approximate analysis as follows:

|  | Percent |
|---|---|
| Sodium ribonucleinate | 50 |
| Allantoin | 50 |

This modified composition is soluble up to 5% in water and is very soluble in hot water.

The foregoing detailed description has been given for clearness of understanding only and no unnecessary limitations are to be understood therefrom. The invention is not limited to the exact details shown and described, for obvious modifications will occur to those skilled in the art.

What is claimed is:
Allantoin sodium ribonucleinate.

No references cited.

LEWIS GOTTS, Primary Examiner.
ELBERT L. ROBERTS, Examiner.
JOHNNIE R. BROWN, Assistant Examiner.